(12) United States Patent
Fromm et al.

(10) Patent No.: US 8,739,364 B2
(45) Date of Patent: Jun. 3, 2014

(54) PROTECTED CASTER ASSEMBLY

(75) Inventors: Paul M. Fromm, Rochester, NY (US);
Dara N. Lubin, Pittsford, NY (US);
Daniel M. McHugh, Rochester, NY (US); Terrance W. Flint, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 3 days.

(21) Appl. No.: 13/545,626

(22) Filed: Jul. 10, 2012

(65) Prior Publication Data

US 2014/0013541 A1    Jan. 16, 2014

(51) Int. Cl.
*B60B 33/04* (2006.01)

(52) U.S. Cl.
USPC .............................. 16/19; 16/42 R

(58) Field of Classification Search
USPC ............. 16/19, 32, 33, 42 R; 280/92, 5.3; 248/346.11
See application file for complete search history.

(56) References Cited

U.S. PATENT DOCUMENTS

| | | | | |
|---|---|---|---|---|
| 1,000,731 A | * | 8/1911 | Hanpeter | 16/19 |
| 1,417,640 A | * | 5/1922 | Sterner | 16/19 |
| 2,002,455 A | * | 5/1935 | Schwerin | 280/43.14 |
| 2,115,114 A | | 4/1938 | McClain | |
| 2,566,853 A | * | 9/1951 | Reinhardt | 16/35 R |
| 2,592,942 A | * | 4/1952 | Moore | 248/184.1 |
| 3,435,938 A | | 4/1969 | Warren et al. | |
| 3,445,882 A | | 5/1969 | Miano | |
| 3,458,068 A | | 7/1969 | Scott | |
| 3,724,022 A | * | 4/1973 | Alberti et al. | 16/45 |
| 3,858,271 A | * | 1/1975 | Howard et al. | 16/45 |
| 4,125,183 A | | 11/1978 | Lang | |
| 5,076,412 A | | 12/1991 | Huber | |
| D329,011 S | | 9/1992 | Block | |
| 5,630,578 A | | 5/1997 | Naramore et al. | |
| 6,032,004 A | | 2/2000 | Mirabella, Jr. et al. | |
| 6,223,388 B1 | | 5/2001 | Sey | |
| 6,244,417 B1 | * | 6/2001 | Timmer et al. | 193/35 MD |
| 6,604,258 B2 | | 8/2003 | Saggio et al. | |
| 6,728,991 B2 | * | 5/2004 | Lai et al. | 16/19 |
| 6,760,953 B2 | | 7/2004 | Ben-Meir | |
| 6,854,159 B2 | | 2/2005 | Ruitenbeek | |
| 8,016,312 B2 | * | 9/2011 | MacEachern | 280/300 |
| 8,424,887 B1 | * | 4/2013 | LeMeur, Jr. et al. | 280/86.1 |

* cited by examiner

*Primary Examiner* — Victor Batson
*Assistant Examiner* — Matthew Sullivan
(74) *Attorney, Agent, or Firm* — Gibb & Riley, LLC

(57) ABSTRACT

An apparatus includes a wheel having an axle, and a round disk connected to the axle. The round disk has a disk middle connected to the axle and a disk circumferential surface surrounding the disk middle. Further, a round ring having an inner ring surface is connected to the disk circumferential surface of the round disk. The round disk is positioned within the round ring. The round ring contacts the round disk along a first plane, and the axle is coplanar with the first plane. Additionally, the round ring has a ring circumferential outer surface having threads. A threaded cylinder having an inner threaded cylinder surface is connected to the threads in the ring circumferential outer surface. The round ring is positioned within the threaded cylinder. Further, a worm gear is positioned between the threaded cylinder and the round ring.

15 Claims, 7 Drawing Sheets

PROTECTED CASTER ASSEMBLY

BACKGROUND

Embodiments herein generally relate to casters and more particularly to a protected caster assembly.

Casters used on heavy items, such as printing equipment, are sometimes easily bent and damaged during installation and subsequent use because of the moment arm between the axle of the caster wheels and the attachment point to the device. Additionally, the frame to which the caster is fastened can be deformed during installation or movement of the unit because of this moment arm. For example, if there is enough momentum, the damage to the casters and/or frame occurs when the caster is caught in irregular floor surfaces, such as carpet edges, elevator cracks, chasms in the loading dock areas, etc.

The bending moment on typical casters is high and acts like a lever on the mounting point of the caster assembly if the caster is suddenly stopped. The current approach is to replace the broken caster for no charge, or to pay special handling charges to the rigging organization to de-palletize devices at the installation site. Furthermore, during leveling of the casters, excess time is used when the features for height adjustment are relatively inaccessible, and the operator is required reach underneath or behind the unit to adjust the vertical position of the unit or level the unit.

SUMMARY

An exemplary apparatus herein includes a wheel having an axle, and a round disk connected to the axle. The round disk has a disk middle connected to the axle and a disk circumferential surface surrounding the disk middle. The wheel can comprise at least two wheels and, in such a situation, the wheels share a common axle.

Further, a round ring having an inner ring surface is connected to the disk circumferential surface of the round disk. The round disk is positioned within the round ring and the round disk rotates freely in the round ring. The round ring comprises a reduced friction surface where the round disk contacts the round ring. The reduced friction surface has a lower coefficient of friction relative to the remainder of the surface of the round ring, and can comprise, for example, polytetrafluoroethylene (PTFE), ball bearings, roller bearings, a lubricant, etc.

The round ring contacts the round disk along a first plane, and the axle is coplanar with the first plane. Additionally, the round ring has a ring circumferential outer surface having threads. A threaded cylinder having an inner threaded cylinder surface is connected to the threads in the ring circumferential outer surface. The round ring is positioned within the threaded cylinder. Also, the disk middle comprises a ramp surface extending in a direction perpendicular to the first plane and away from the round ring and the threaded cylinder.

Further, a worm gear is positioned between the threaded cylinder and the round ring. Rotation of the worm gear rotates the threaded cylinder relative to the round ring, and thereby moves the wheel toward or away from the threaded cylinder. The threads of the ring circumferential outer surface have slots, and the worm gear has worm gear threads that engage the slots of the ring circumferential outer surface. Further, the disk middle has a rotational center point about which the round disk rotates, and the axle is connected to a location offset from the rotational center point of the round disk.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, casters are sometimes easily bent and damaged during installation and subsequent use, and the height of such casters is difficult to adjust. Therefore, the embodiments herein provide a caster assembly 180 wherein the bending moment of the assembly is low, relative to the point at which the assembly is fastened to the frame of the machine, reducing the possibility of deformation to the assembly and frame.

Figure 1:
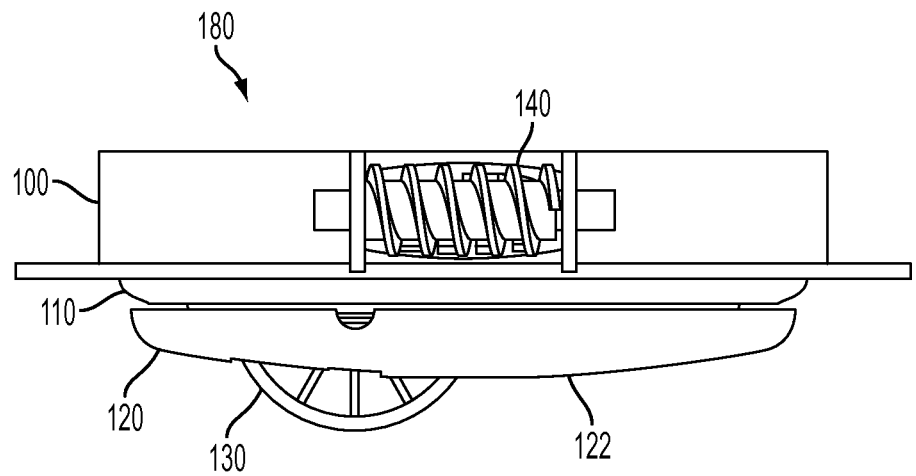
FIG. 1 is a side-view schematic diagram of a device according to embodiments herein.
Figure 2:
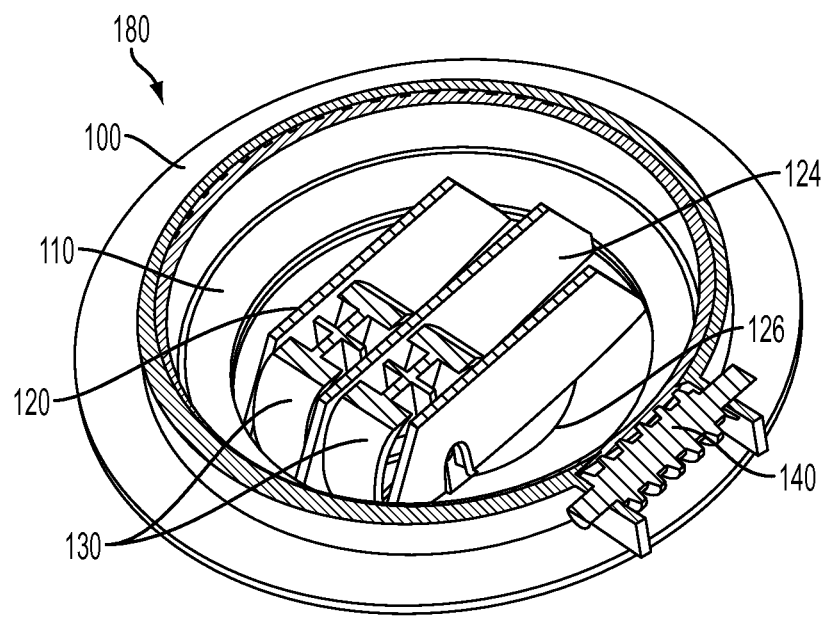
FIG. 2 is a perspective-view schematic diagram of a device according to embodiments herein.

More specifically, as shown in FIGS. 1 and 2, an exemplary caster assembly 180 herein supports the machine frame of the device 10 (as shown, for example in FIG. 10, below) to which the caster assembly 180 is connected. The caster wheels 130 are encircled by a protective ring 110 that provides both a ramp 122 for moving over an uneven surface, and also extended surface area if there is a crack in the floor that can snag or obstruct the caster wheel 130. An opening on the front of the assembly provides access for a height adjustment worm gear 140.

The protected caster assembly 180 includes one or more wheels 130, a rotor disk housing 120, a threaded stator cylinder or ring 110, a flanged outer cylinder 100, and a worm gear 140. While two wheels are illustrated, those ordinarily skilled in the art would understand that 1, 3, 4, 7, 10, etc., or any other number of wheels could be used, depending upon implementation. The exemplary wheel pair 130 can have two independent rotating surfaces, allowing travel on a surface any direction parallel to the line of tangency of the wheel 130 and the floor surface. The wheel pair 130 can be mounted in the rotor disk housing 120 using a shaft or axle 132 (that can be held in place with hex nuts, locking nuts, e-rings, k-clips, or any kind of fastener). The axle 132 can be installed via a slot 121 in the rotor disk 120.

Figure 3:
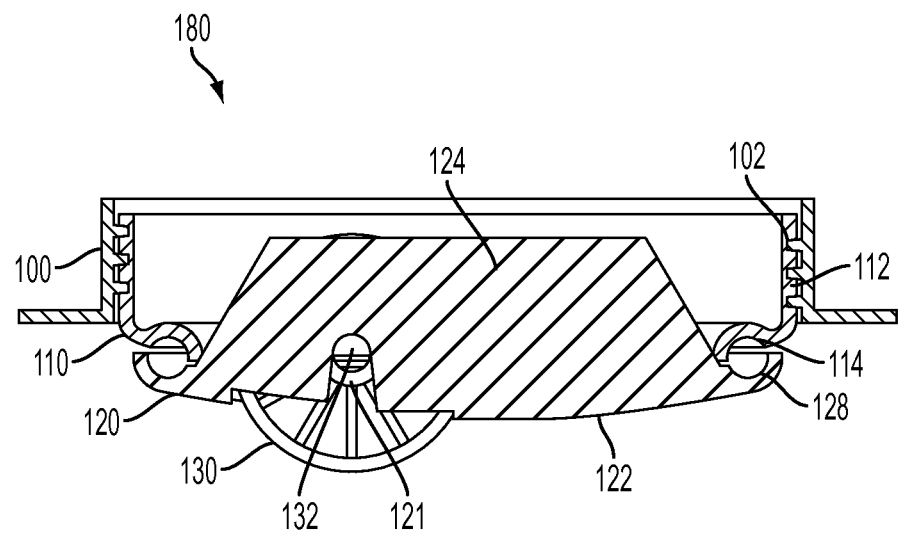
FIG. 3 is a side-view schematic diagram of a device according to embodiments herein.

As shown in FIG. 3, the rotor disk housing 120 and the flanged outer cylinder 100 have a mating channel formed by elements 114 and 128 that can contain ball bearings (or a low-friction material) and this circular channel allows the disk 120 to swivel or rotate within the ring 110 around a relatively vertical axis (this vertical axis being perpendicular to the axle 132 of the wheels 130, but being positioned in a different plane).

Figure 4:
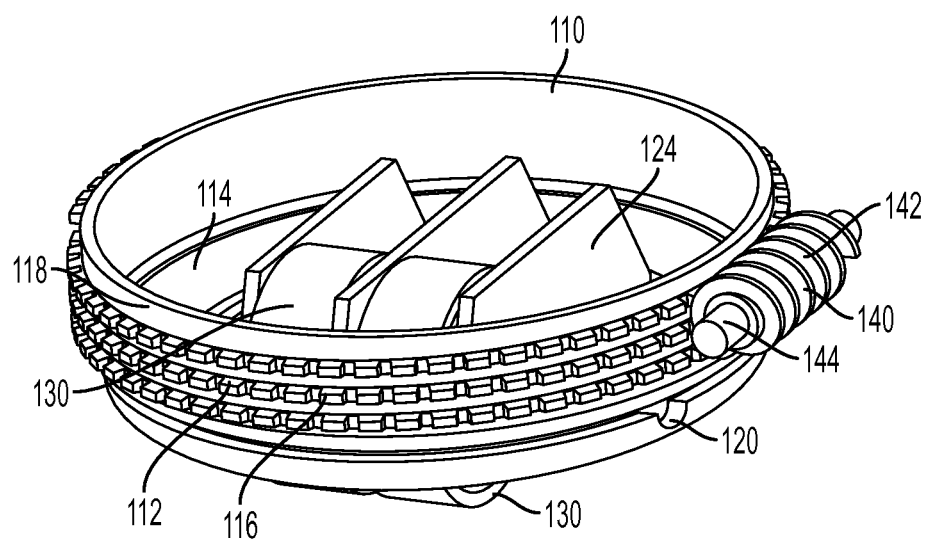
FIG. 4 is a perspective-view schematic diagram of a device according to embodiments herein.
Figure 5:
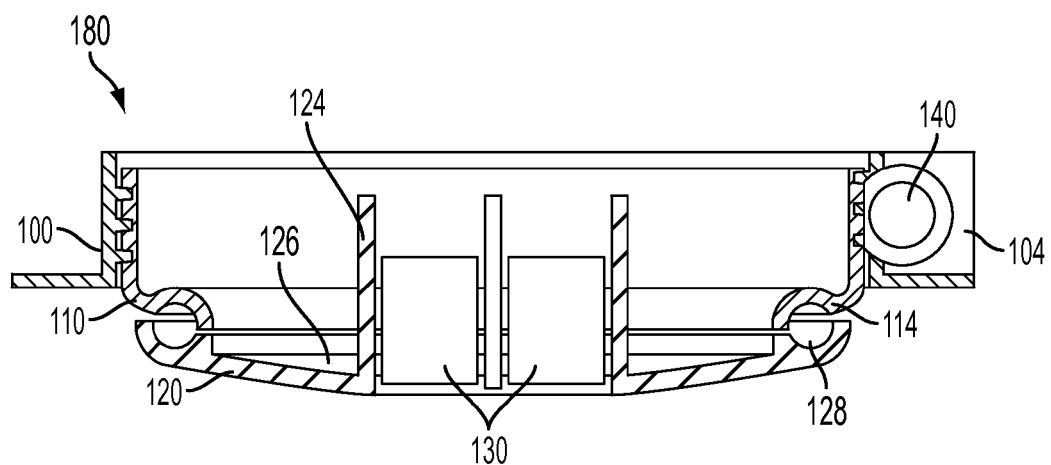
FIG. 5 is a side-view schematic diagram of a device according to embodiments herein.

The worm gear 140 shown in FIG. 4 has threads 142 that engage the slots 116 that break up the threads 112 on the exterior of the stator cylinder/ring 110 to allow vertical adjustment of the stator cylinder/ring 110 relative to the flanged outer cylinder 100. As shown in FIGS. 1 and 5, the worm gear 140 is connected to the flanged cylinder 100 and held in place by a boxed structure 104 that accommodates the worm gear 140, and that includes openings allowing the user to easily reach the worm gear 140 to rotate the worm gear 140. Thus, the threads 142 on the worm gear engage the slots 116 formed in the threads 112 of the stator cylinder 110 to move the stator cylinder 110 along the length direction of the worm gear, thereby rotating the stator cylinder relative to the worm gear 140 and to the flanged cylinder 100.

Figure 7:
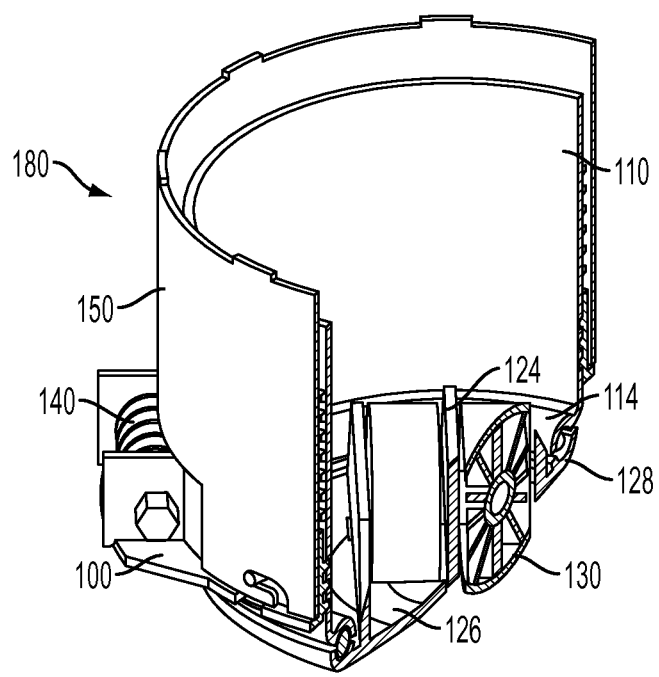
FIG. 7 is a perspective-view schematic diagram of a device according to embodiments herein.
Figure 8:
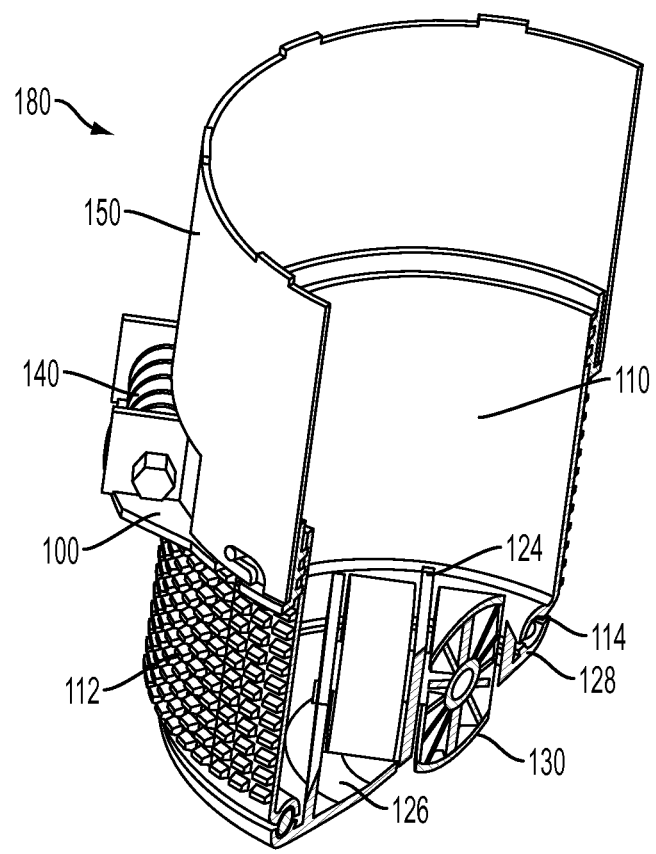
FIG. 8 is a perspective-view schematic diagram of a device according to embodiments herein.

Therefore, rotation of one end 144 (using an appropriate tool, such as a wrench, hex socket, screwdriver, etc.) of the worm gear 140 rotates the stator cylinder 110 within the flanged cylinder 100. This relative rotation moves (by operation of the threads 112 on the outside of the stator cylinder 110 and the engaged threads 102 on the inside of the flanged cylinder 100) the stator cylinder 110 into and out of the cylinder 100, and thus allows vertical adjustment of the caster wheels 130 relative to the machine frame. Flanges on the outer cylinder 100 mount to the frame of the machine module 10, or the whole assembly could be mounted in a tube 150 which could be attached to the frame, as shown in FIGS. 7 and 8. As shown in FIGS. 1-5, the range of height adjustment can be relatively small, or can be relatively larger as shown in FIGS. 7-8, depending upon the height of the stator cylinder 110 (and such can be supported with a support tube 150, if necessary).

Figure 6:
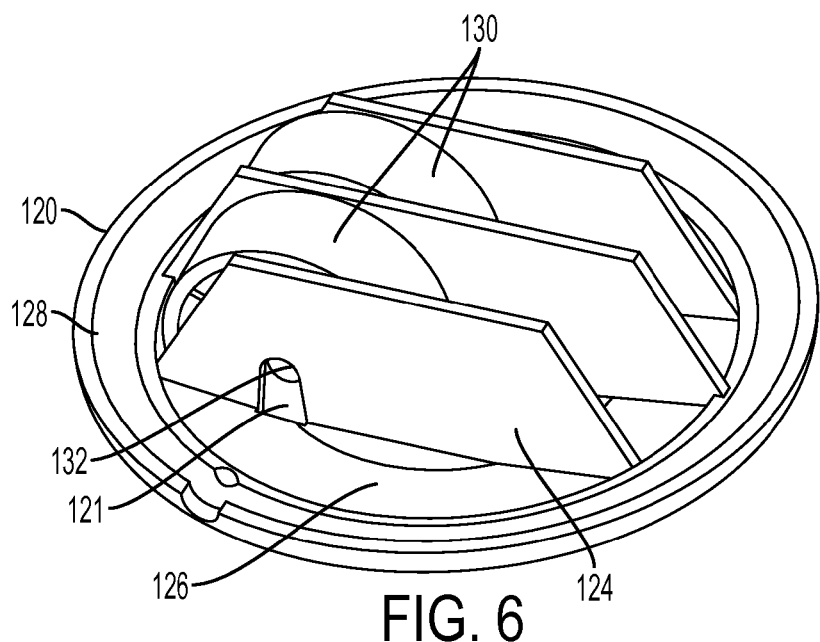
FIG. 6 is a perspective-view schematic diagram of a device according to embodiments herein.

As shown in FIG. 6, the rotor disk housing 120 is a circular part that is symmetrical and the wheel pair 130 is mounted to one side on two or more protruding fins 124. The offset mounting allows for the caster assembly 180 to swivel so that the wheels 130 line up parallel to the direction of the force that is pushing the assembly. The bottom of the rotor disk housing 120 functions as a ramp 122 to assist transition over uneven surfaces. Unlike conventional casers, the rotor disk 120 swivels instead of the caster stem, so the caster wheel 130 itself is protected throughout its entire possible circumference of motion.

All elements herein can be made out of impact-resistant plastics, metals, alloys, ceramics, rubbers, etc. The parts herein can be held together by means of snap features, adhesives, screws, bolts, rivets, attachment devices, etc.

Thus as shown above, exemplary caster assemblies herein include at least one wheel 130 having an axle 132, and a round disk 120 connected to the axle 132. The round disk 120 has a disk middle 126 connected to the axle 132 and a disk circumferential surface 128 surrounding the disk middle 126. The wheel 130 can comprise at least two wheels 130 and, in such a situation, the wheels 130 share a common axle 132. Further, the disk middle 126 has a rotational center point about which the round disk 120 rotates, and the axle 132 is connected to a location offset from the rotational center point of the round disk 120 to allow the wheel 130 to be aligned with the direction of travel by the force applied to the wheel (as shown in FIG. 9).

Further, a round ring 110 having an inner ring surface 114 is connected to the disk circumferential surface 128 of the round disk 120. The round disk 120 is positioned within the round ring 110 and the round disk 120 rotates freely in the round ring 110. The round ring 110 comprises a reduced friction surface where the round disk 120 contacts the round ring 110. The reduced friction surface has a lower coefficient of friction relative to the remainder of the surface of the round ring 110, and can comprise, for example, polytetrafluoroethylene (PTFE), ball bearings, roller bearings, an oil-based lubricant, etc.

Figure 9:
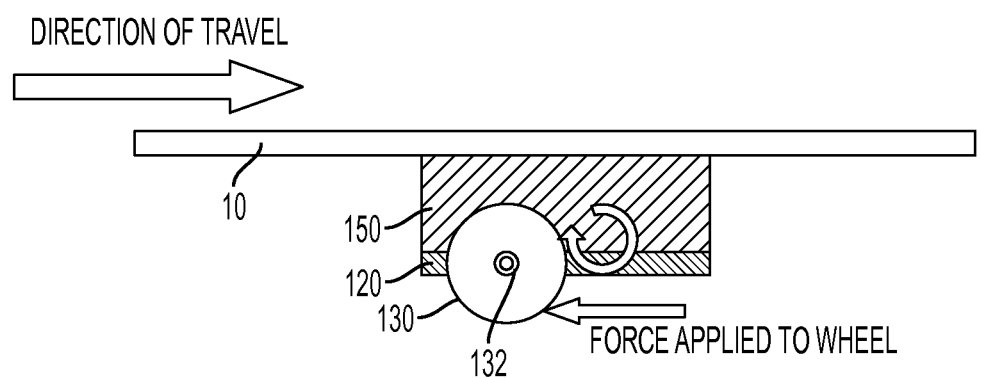
FIG. 9 is a side-view schematic diagram of a device according to embodiments herein.

As shown in FIGS. 3 and 9, the round ring 110 contacts the round disk 120 along a first plane, and the axle 132 is coplanar with this first plane. Additionally, the round ring 110 has a ring circumferential outer surface 118 having threads 112. A threaded cylinder 100 having an inner threaded cylinder surface 102 is connected to the threads 112 in the ring circumferential outer surface 118. The round ring 110 is positioned within the threaded cylinder 100.

Also, the disk middle 126 comprises a ramp 122 surface extending in a direction perpendicular to the first plane and away from the round ring 110 and the threaded cylinder 100. More specifically, as shown most clearly in FIG. 3, the bottom of the disk 126 is not flat, but has a non-symmetric convex exterior shape. This form a ramp 122, which is a bump or protrusion that extends downward, in the same direction that the wheel 130 extends from the caster 180. When a floor surface having a sufficient height change (such as a raised door threshold, a crack, a hole, etc.) is encountered, the ramp 122 can make contact with the higher portion of the floor surface (and the wheel can potentially be lifted to loose contact with the lower portion of the uneven floor surface). This allows the ramp 122 to take part or all of the weight that would otherwise be born by the wheel 130, reducing the side forces applied to the wheel when the wheel 130 eventually returns to contact the uneven floor surface. As is shown in FIG. 3, less than half of the wheel 130 (such as 40%, 20%, etc.) extends below the ramp 122, thereby reducing the lateral forces that can be applied to the wheel by such uneven floor surfaces.

Further, a worm gear 140 is positioned between the threaded cylinder 100 and the round ring 110. Rotation of the worm gear 140 rotates the threaded cylinder 100 relative to the round ring 110, and thereby moves the wheel 130 toward or away from the threaded cylinder 100. As shown in FIG. 4, the threads 112 of the ring circumferential outer surface 118 have slots 116, and the worm gear 140 has worm gear 140 threads 112 that engage the slots 116 of the ring circumferential outer surface 118. Therefore, the ring circumferential outer surface 118 has two different interlaced grooves/threads, which are perpendicular to one another. One of the set of grooves/threads 112 engage the corresponding grooves/threads 102 of the outer cylinder 100, and a perpendicular set of grooves/slots 116 engage the grooves/threads 142 of the worm gear 140. These interlaced grooves/threads 112, 116 allow the worm gear to rotate the ring 110 within the cylinder 100, which moves the ring 110 into or out of the cylinder 100.

Therefore, as shown above, the flanged cylinder 100 and the stator cylinder/ring 110 along with the ball bearings work to lower the bending moment of the caster assembly 180 in order to minimize the likelihood of deforming the caster assembly or the frame to which it is attached. The rotor disk 120 shields the caster in its entire circumference and also provides a ramp 122 to assist in large crevices on the floor surface or transitions of uneven surfaces. The worm gear 140 mounted on the side of the assembly provides a point for a variety of hex sockets or equivalent hardware that the operator can easily access.

With the flanged cylinder 100 and the stator cylinder/ring 110 the moment arm that could cause the damage is much shorter compared to the conventional caster stem and is not easily deformed. The ramp 122 facilitates travel over uneven surface while safeguarding the caster wheel 130 from falling into large cracks. Further, the accessible worm gear 140 saves time during adjustment and leveling of heavy devices, such at the printing and finishing modules, shown in FIG. 10.

Figure 10:
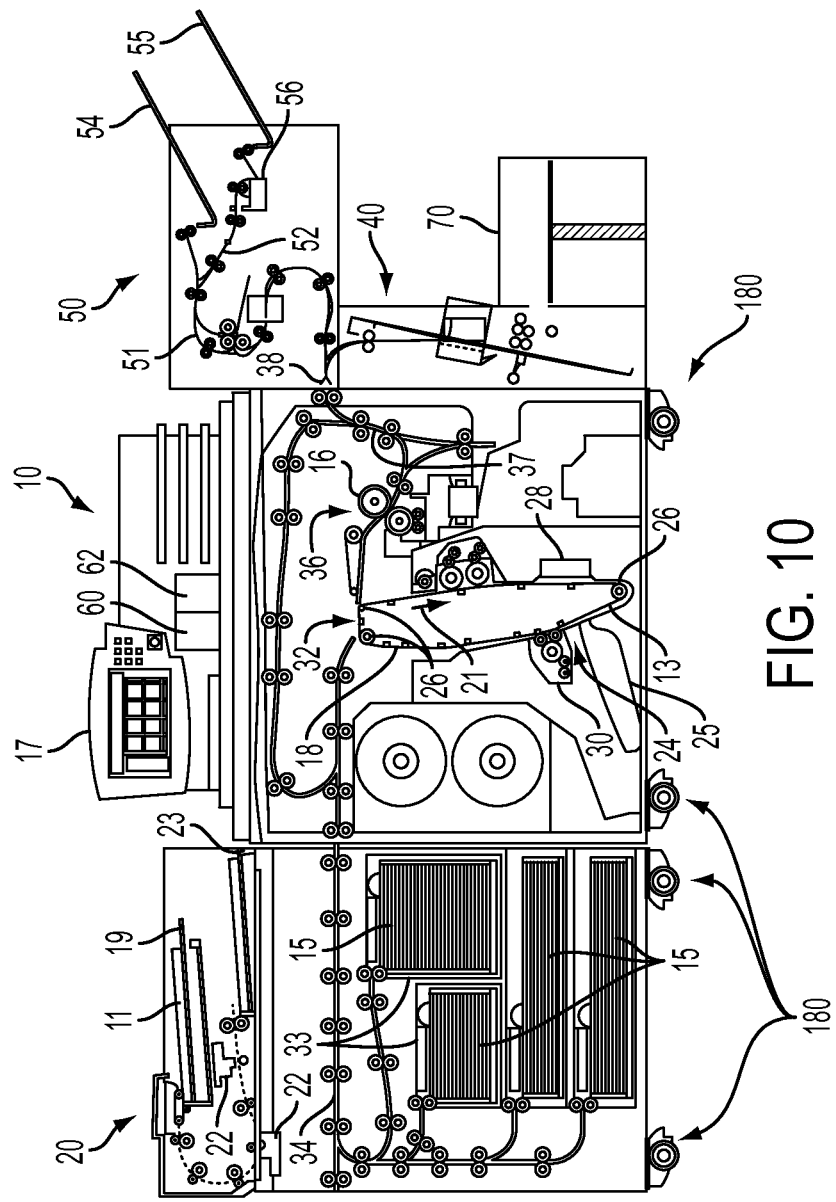
FIG. 10 is a side-view schematic diagram of a device according to embodiments herein.

More specifically, FIG. 10 illustrates a printing machine 10 that includes an automatic document feeder 20 (ADF) that can be used to scan (at a scanning station 22) original documents 11 fed from a tray 19 to a tray 23, all of which are supported by the caster assemblies 180, discussed above. The user may enter the desired printing and finishing instructions through the graphic user interface (GUI) or control panel 17, or use a job ticket, an electronic print job description from a remote source, etc. The control panel 17 can include one or more processors 60, power supplies, as well as storage devices 62 storing programs of instructions that are readable by the processors 60 for performing the various functions described herein. The storage devices 62 can comprise, for example, non-transitory storage mediums including magnetic devices, optical devices, capacitor-based devices, etc.

An electronic or optical image or an image of an original document or set of documents to be reproduced may be projected or scanned onto a charged surface 13 or a photoreceptor belt 18 to form an electrostatic latent image. The belt photoreceptor 18 here is mounted on a set of rollers 26. At least one of the rollers is driven to move the photoreceptor in the direction indicated by arrow 21 past the various other known electrostatic processing stations including a charging station 28, imaging station 24 (for a raster scan laser system 25), developing station 30, and transfer station 32.

Thus, the latent image is developed with developing material to form a toner image corresponding to the latent image. More specifically, a sheet 15 is fed from a selected paper tray supply 33 to a sheet transport 34 for travel to the transfer station 32. There, the toned image is electrostatically transferred to a final print media material 15, to which it may be permanently fixed by a fusing device 16. The sheet is stripped from the photoreceptor 18 and conveyed to a fusing station 36 having fusing device 16 where the toner image is fused to the sheet. A guide can be applied to the substrate 15 to lead it away from the fuser roll. After separating from the fuser roll, the substrate 15 is then transported by a sheet output transport 37 to output trays a multi-function finishing station 50.

Printed sheets 15 from the printer 10 can be accepted at an entry port 38 and directed to multiple paths and output trays 54, 55 for printed sheets, corresponding to different desired actions, such as stapling, hole-punching and C or Z-folding. The finisher 50 can also optionally include, for example, a modular booklet maker 40 although those ordinarily skilled in the art would understand that the finisher 50 could comprise any functional unit, and that the modular booklet maker 40 is merely shown as one example. The finished booklets are collected in a stacker 70. It is to be understood that various rollers and other devices which contact and handle sheets within finisher module 50 are driven by various motors, solenoids and other electromechanical devices (not shown), under a control system, such as including the microprocessor 60 of the control panel 17 or elsewhere, in a manner generally familiar in the art.

Thus, the multi-functional finisher 50 has a top tray 54 and a main tray 55 and a folding and booklet making section 40 that adds stapled and unstapled booklet making, and single sheet C-fold and Z-fold capabilities. The top tray 54 is used as a purge destination, as well as, a destination for the simplest of jobs that require no finishing and no collated stacking. The main tray 55 can have, for example, a pair of pass-through sheet upside down staplers 56 and is used for most jobs that require stacking or stapling As would be understood by those ordinarily skilled in the art, the printing device 10 shown in FIG. 10 is only one example and the embodiments herein are equally applicable to other types of printing devices that may include fewer components or more components. For example, while a limited number of printing engines and paper paths are illustrated in FIG. 10, those ordinarily skilled in the art would understand that many more paper paths and additional printing engines could be included within any printing device used with embodiments herein.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:
1. An apparatus comprising:
a wheel having an axle;

a round disk connected to said axle, said round disk having a disk middle connected to said axle and a disk circumferential surface surrounding said wheel and said disk middle;

a round ring having an inner ring surface connected to said disk circumferential surface of said round disk, said round disk being positioned within said round ring, said round ring contacting said round disk along a first plane, said axle being coplanar with said first plane, and said round ring comprising a ring circumferential outer surface having threads;

a threaded cylinder having an inner threaded cylinder surface connected to said threads in said ring circumferential outer surface, said round ring being positioned within said threaded cylinder; and a worm gear connected to said threaded cylinder and contacting said round ring, rotation of said worm gear rotating said threaded cylinder relative to said round ring and thereby moving said wheel one of toward and away from said threaded cylinder.

2. The apparatus according to claim 1, said disk middle comprising a ramp surface extending in a direction perpendicular to said first plane and away from said round ring and said threaded cylinder.

3. The apparatus according to claim 1, said wheel comprising at least two wheels, and said at least two wheels sharing a common axle.

4. The apparatus according to claim 1, said round disk rotating freely in said round ring.

5. The apparatus according to claim 1, said round ring comprising a reduced friction surface where said round disk contacts said round ring, said reduced friction surface having a lower coefficient of friction relative to a remainder of a surface of said round ring.

6. An apparatus comprising:

a wheel having an axle;

a round disk connected to said axle, said round disk having a disk middle connected to said axle and a disk circumferential surface surrounding said disk middle;

a round ring having an inner ring surface connected to said disk circumferential surface of said round disk, said round disk being positioned within said round ring, said round ring contacting said round disk along a first plane, said axle being coplanar with said first plane, and said round ring comprising a ring circumferential outer surface having threads;

a threaded cylinder having an inner threaded cylinder surface connected to said threads in said ring circumferential outer surface, said round ring being positioned within said threaded cylinder; and a worm gear connected to said threaded cylinder and contacting said round ring, rotation of said worm gear rotating said threaded cylinder relative to said round ring and thereby moving said wheel one of toward and away from said threaded cylinder, said threads of said ring circumferential outer surface having slots, and said worm gear comprising worm gear threads that engage said slots of said ring circumferential outer surface.

7. The apparatus according to claim 6, said disk middle comprising a ramp surface extending in a direction perpendicular to said first plane and away from said round ring and said threaded cylinder.

8. The apparatus according to claim 6, said wheel comprising at least two wheels, and said at least two wheels sharing a common axle.

9. The apparatus according to claim 6, said round disk rotating freely in said round ring.

10. The apparatus according to claim 6, said round ring comprising a reduced friction surface where said round disk contacts said round ring, said reduced friction surface having a lower coefficient of friction relative to a remainder of a surface of said round ring.

11. An apparatus comprising:

a wheel having an axle;

a round disk connected to said axle, said round disk having a disk middle connected to said axle and a disk circumferential surface surrounding said disk middle;

a round ring having an inner ring surface connected to said disk circumferential surface of said round disk, said round disk being positioned within said round ring, said round ring contacting said round disk along a first plane, said axle being coplanar with said first plane, and said round ring comprising a ring circumferential outer surface having threads;

a threaded cylinder having an inner threaded cylinder surface connected to said threads in said ring circumferential outer surface, said round ring being positioned within said threaded cylinder; and a worm gear connected to said threaded cylinder and contacting said round ring, rotation of said worm gear rotating said threaded cylinder relative to said round ring and thereby moving said wheel one of toward and away from said threaded cylinder, said threads of said ring circumferential outer surface having slots, said worm gear comprising worm gear threads that engage said slots of said ring circumferential outer surface, said disk middle having a rotational center point about which said round disk rotates, and said axle being connected to a location offset from said rotational center point of said round disk.

12. The apparatus according to claim 11, said disk middle comprising a ramp surface extending in a direction perpendicular to said first plane and away from said round ring and said threaded cylinder.

13. The apparatus according to claim 11, said wheel comprising at least two wheels, and said at least two wheels sharing a common axle.

14. The apparatus according to claim 11, said round disk rotating freely in said round ring.

15. The apparatus according to claim 11, said round ring comprising a reduced friction surface where said round disk contacts said round ring, said reduced friction surface having a lower coefficient of friction relative to a remainder of a surface of said round ring.

* * * * *